US012607054B1

(12) United States Patent
Mitchell et al.

(10) Patent No.: US 12,607,054 B1
(45) Date of Patent: Apr. 21, 2026

(54) STOP HINGE

(71) Applicant: Kason Industries, Inc., Newnan, GA (US)

(72) Inventors: Brett A. Mitchell, Newnan, GA (US); Zachary Johnson, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 0 days.

(21) Appl. No.: 18/920,191

(22) Filed: Oct. 18, 2024

(51) Int. Cl.
*E05D 11/00* (2006.01)
*E05D 11/06* (2006.01)

(52) U.S. Cl.
CPC .......... *E05D 11/0054* (2013.01); *E05D 11/06* (2013.01); *E05Y 2900/31* (2013.01)

(58) Field of Classification Search
CPC ....... E05D 11/0054; E05D 7/04; E05D 7/043; E05D 2007/0438; E05D 2007/0446; E05D 2007/0453; E05D 2007/0484; E05D 2007/0492; E05D 7/0009; E05D 7/0045; E05D 2007/0072; E05D 11/06; E05F 5/06; E05C 17/025
USPC .................................................... 16/374, 375
See application file for complete search history.

(56) References Cited

U.S. PATENT DOCUMENTS 2,027,888 A 1/1936 Solomon
2,581,104 A 1/1952 Houlsby, Jr.
2,586,757 A * 2/1952 Wummel ................ E05D 11/06 16/377
2,615,194 A 10/1952 Kreiner
3,178,762 A * 4/1965 Whiting .................. E05D 11/06 16/375
3,626,548 A 12/1971 Hellmuth
3,866,658 A 2/1975 Smith
3,971,099 A * 7/1976 Wallace .................. E05D 11/06 16/50
4,156,301 A 5/1979 Schneider et al.
4,407,044 A * 10/1983 Iseki ................... E05D 11/1014 16/237
4,991,259 A 2/1991 Finkelstein et al.
5,218,739 A 6/1993 Lautenschlager
5,265,922 A * 11/1993 Falcone .................. E05D 11/06 292/288
5,491,930 A 2/1996 La See
5,642,910 A * 7/1997 Betherum ........... E05D 11/1007 292/288
5,727,289 A * 3/1998 Reder ........................ E05F 5/06 16/375
5,881,431 A * 3/1999 Pieper, II ................ E05D 11/06 16/374
6,049,946 A 4/2000 Cress et al.
(Continued)

*Primary Examiner* — Jeffrey O'Brien
(74) *Attorney, Agent, or Firm* — Baker, Donelson, Bearman, Caldwell & Berkowitz PC

(57) ABSTRACT

A stop hinge for use with food service or refrigerator equipment has a mounting flange and a metallic strap. The mounting flange has a top lug, a bottom lug, and a bridge. The strap has two oppositely disposed strap ends and a middle portion. An adjustment plate is coupled to the strap to allow adjustable mounting movement. The stop hinge also includes a rubber bumper or stop cover coupled to the strap through the adjustment plate. The stop cover includes a stop wall having an exterior stop wall surface that is configured to abut the bridge when the stop hinge is moved to its door opened position.

6 Claims, 3 Drawing Sheets

(56) References Cited

U.S. PATENT DOCUMENTS

| | | | | |
|---|---|---|---|---|
| 6,152,554 | A * | 11/2000 | Parisi | E05D 7/04 16/249 |
| 6,202,255 | B1 | 3/2001 | Sitter | |
| 6,374,458 | B1 * | 4/2002 | Finkelstein | E05F 1/061 16/235 |
| 7,055,214 | B1 * | 6/2006 | Finkelstein | E05D 7/04 16/248 |
| 7,870,642 | B1 * | 1/2011 | Finkelstein | E05D 7/0423 16/242 |
| 7,945,996 | B2 | 5/2011 | Gunderson | |
| 8,020,253 | B1 | 9/2011 | Finkelstein et al. | |
| 9,416,574 | B2 | 8/2016 | Mitchell et al. | |
| 9,487,980 | B2 * | 11/2016 | Pelekanos | E05D 7/0045 |
| 9,670,706 | B2 * | 6/2017 | Ching | E05C 19/184 |
| 10,221,598 | B2 * | 3/2019 | Dolman | E05D 11/0054 |
| 11,066,862 | B1 * | 7/2021 | Rowland | E05D 11/0081 |
| 11,306,523 | B2 * | 4/2022 | Shin | E05D 11/0054 |
| 12,044,048 | B1 * | 7/2024 | Wylie | E05C 17/025 |
| 2009/0077767 | A1 * | 3/2009 | Alchin | E05D 5/06 16/237 |
| 2013/0104344 | A1 * | 5/2013 | Lacy | E05D 5/14 16/374 |

* cited by examiner

STOP HINGE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD OF THE INVENTION

The present inventive concept relates to the field of hinges. More particularly, the invention relates to a stop hinge for limiting the rotation of a door for refrigeration and food service equipment

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Food service and restaurant equipment, such as refrigerators, freezers, food dispensers, ice machines, point of purchase machines, beverage dispensers, and the like, typically include a door. The door is mounted to the main housing or frame through hinges. In some instances, it may be desired to limit the opening or swinging of the door so that the door does not interfere with travel space or come into contact with adjacent objects or structures. As such, hinges that limit the pivoting or opening angle of a door may be referred to as stop hinges.

Some stop hinges include mounting flange and a strap pivotally coupled to the mounting flange. The strap may include a portion, such as a stop arm, that extends from the strap that is configured to hit the mounting flange to limit the rotation of the strap. This abrupt contact between the stop arm and the mounting flange may cause damage or excess wear over time.

Accordingly, there is a need in the art for an improved stop hinge for food service and refrigeration equipment that does not cause breakage or excessive wear. It is to such that the present invention is primarily directed.

BRIEF SUMMARY OF THE INVENTION

A stop hinge for use with refrigeration equipment comprises a mounting flange having a bumper contact surface, a strap pivotally coupled to the mounting flange for pivotal movement between a door closed position and a door open position, and a resilient stop cover coupled to the strap, the resilient stop cover including a stop wall having a stop wall surface configured to abut the bumper contact surface when the strap is pivoted to the door open position.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
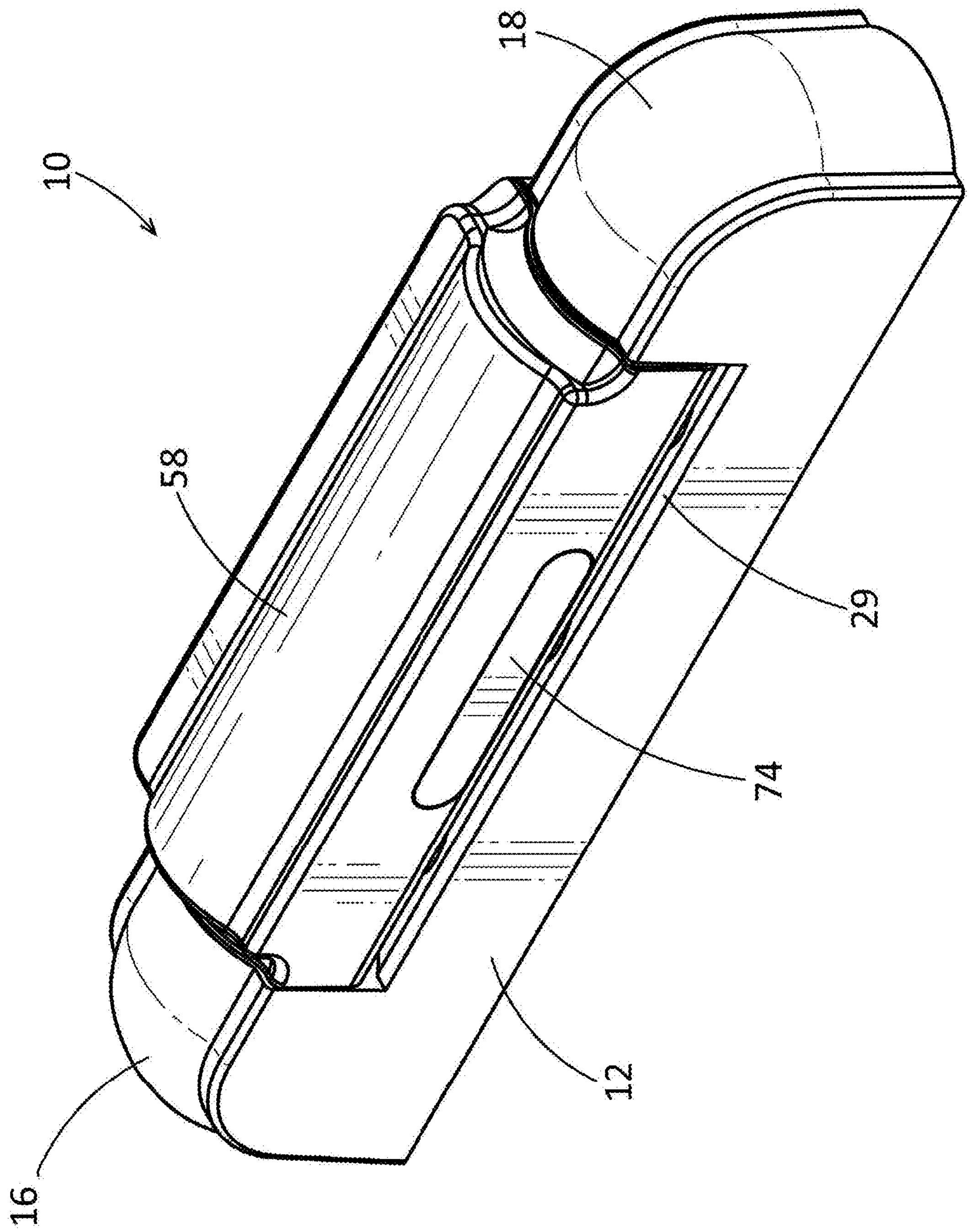
FIG. 1 is a perspective view of a stop hinge embodying principles of the invention in a preferred form.
Figure 2:
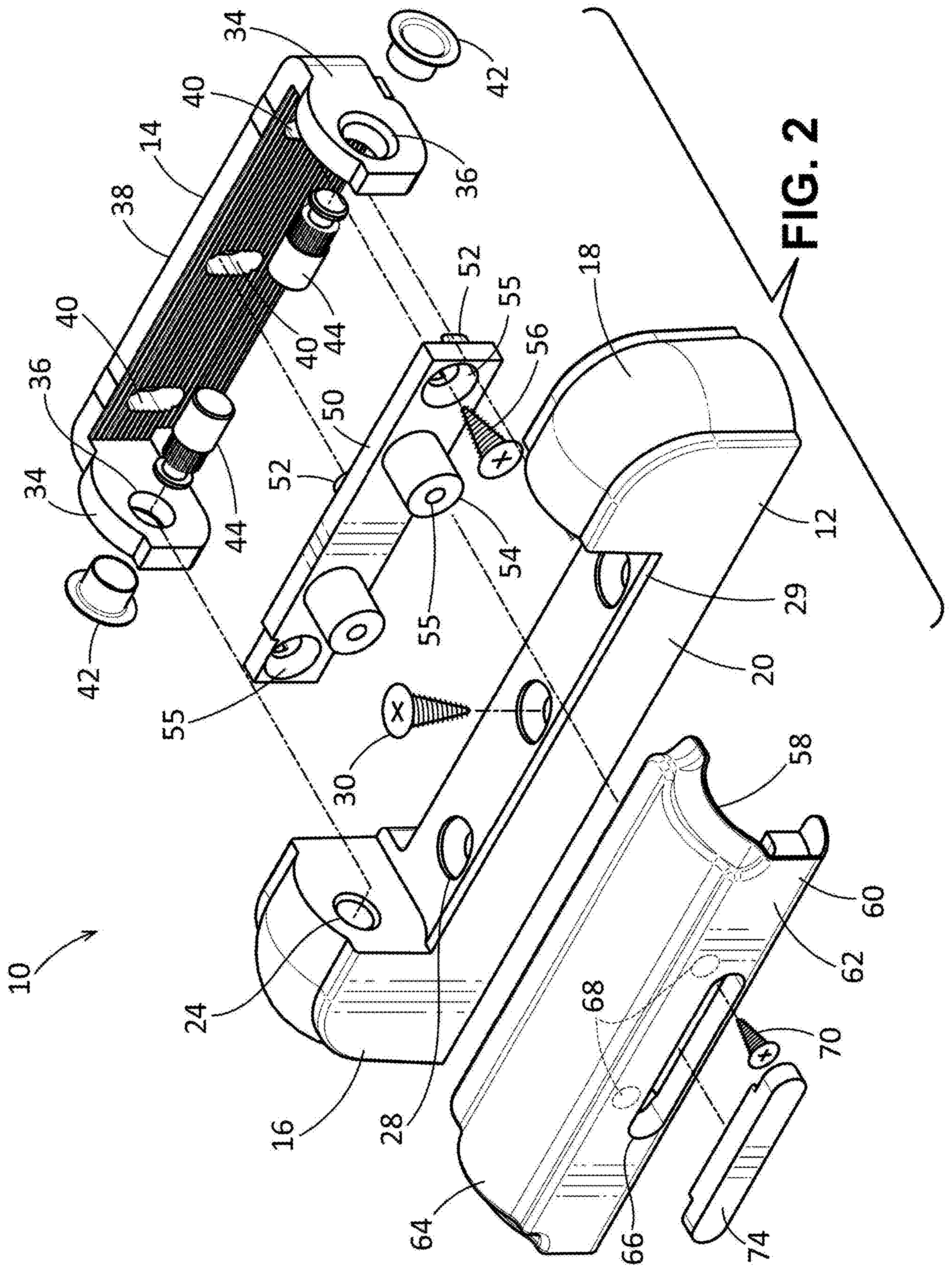
FIG. 2 is an exploded, perspective view of the stop hinge of FIG. 1.

For purposes of the present disclosure, it is noted that spatially relative terms, such as “up,” “down,” “right,” “left,” “beneath,” “below,” “lower,” “above,” “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

Description of Selected Specific Embodiments

With reference next to the drawings, there is a shown a stop hinge 10 according to the present invention. It is to be appreciated that the stop hinge 10 shown in the drawings, is configured for use with food service or refrigeration equipment such as refrigerators, freezers, food dispensers, ice machines, point of purchase machines, and beverage dispensers, and the like, referenced hereinafter collectively as a refrigerator. The stop hinge 10 includes a metallic mounting flange 12 mounted to a cabinet or frame of the refrigerator and a metallic strap 14 mounted to the door of the refrigerator.

The mounting flange 12 has a top end or lug 16, a bottom end or lug 18, and a middle portion or bridge 20 extending between the top lug 16 and bottom lug 18. The top lug 16 has a pivot pin hole 24, while the bottom lug 18 has a similar pivot pin hole 26 therein. The middle portion 20 has three screw mounting holes 28 extending from an elongated, generally linear bumper contact upper or top surface 29 that is configured to receive three mounting screws 30.

The strap 14 has two oppositely disposed strap ends or flanges 34 each having a pivot pin mounting hole 36 therethrough. The strap 14 also has a middle portion 38 having three elongated screw mounting holes 40 therethrough. A bushing or bearing 42 is positioned within each pivot pin mounting hole 36. The strap 14 is pivotally coupled to the mounting flange 12 through two pivot pins 44, wherein each pivot pin 44 extends through a bearing 42 and pivot pin mounting hole 36 and into the pivot pin mounting hole 24 of the mounting flange 12.

An adjustment plate 48 is coupled to the strap 14 to allow adjustable mounting movement. The adjustment plate 48 has an elongated base 50, three alignment pins 52 configured to be received within the three elongated screw mounting holes 40 of the strap 14, and two internally threaded bosses 54 extending from the base 50 oppositely disposed from the three alignment pins 52. The adjustment plate 48 has two screw mounting holes 55 that extend coaxially through the two outboard alignment pins 52. Two mounting screws 56 pass through screw mounting holes 55 and through the two outboard elongate screw mounting holes 40.

The stop hinge 10 also includes a rubber bumper or stop cover 58 that is coupled to the strap 14 through adjustment plate 48. The stop cover 58 includes a stop wall 60 having an elongated generally flat and linear, exterior stop wall surface 62 oppositely disposed from the strap 14, and a top wall 64 extending from the stop wall 60. The stop wall 60 has a cavity or recess 66 and two mounting screw holes 68 extending from the cavity 66 and partially through the stop wall 60. The two mounting screw holes 68 are aligned with the two internally threaded bosses 54. Two mounting screws 70 extend through the two mounting screw holes 68 and are threadably received within the two internally threaded bosses 54 to removably mount the stop cover 58 to the strap 14. The head 72 of each mounting screw 70 resides completely within the cavity 66 to obstruct them from view and to provide a flush contact surface of the stop wall surface 62. A removable insert 74 fits snugly within the cavity 66 to provide a sealing of the cavity 66 and an aesthetically pleasing appearance.

In use, the stop hinge 10 is mounted to a refrigerator or food service structure surrounding a door D, such as a wall, frame, cabinet, door jamb, or the like and the adjoining door D with the strap 14 already coupled to the mounting flange 12. In order to mount the stop hinge 10, the adjustment plate 48 is coupled to the strap 14 by passing the three adjustment pins 52 into the elongated mounting holes 40 of the strap 14. The two mounting screws 56 are then passed through screw mounting holes 55 and the two outboard elongated mounting holes 40 and the mounting screws 56 are threaded into the door D.

Next, the mounting flange 12 and now attached door are moved to the proper position of the mounting flange 12 upon the structure S surrounding the door D. The three mounting screws 30 are then passed through screw mounting holes 28 in the mounting flange 12 and the mounting screws 30 are threaded into the structure to secure the stop hinge 10 and coupled D to the structure S.

Lastly, the stop cover 58 is positioned against the strap 14 and adjustment plate 48 so that the mounting screw holes 68 of the stop cover 58 are aligned with the screw mounting holes 55 of the bosses 54 of the adjustment plate 48. Mounting screws 70 are then passes into the cavity 66 so that the shanks of the mounting screws 70 pass through mounting holes 68 and are threaded into screw mounting holes 55 of the bosses 54, thereby fixing the position of the stop cover 58 in place with the head 72 of the screws 70 residing in the cavity 66 . . . . The insert 74 is then pushed into the cavity 66 to seal the stop cover 58. The door may now pivot relative to the adjoining structure S by the pivoting or rotation of strap 14 relative to mounting flange 12 through pivot pins 44.

Figure 3:
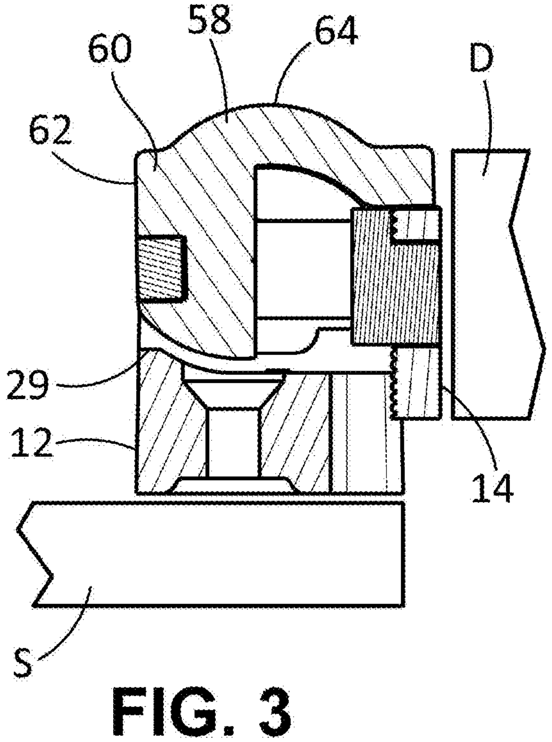
FIG. 3 is a cross-sectional view of the stop hinge of FIG. 1, shown in a door closed position.
Figure 4:
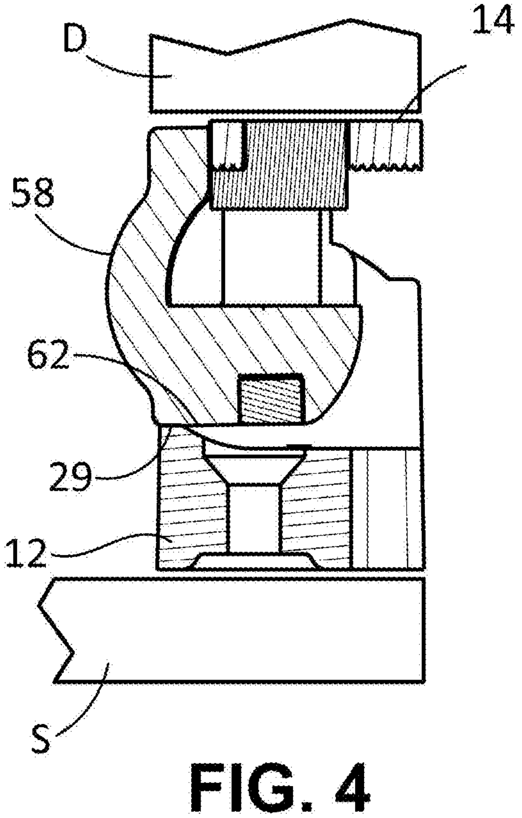
FIG. 4 is a cross-sectional view of the stop hinge of FIG. 1, shown in a door open position.
Figure 5:
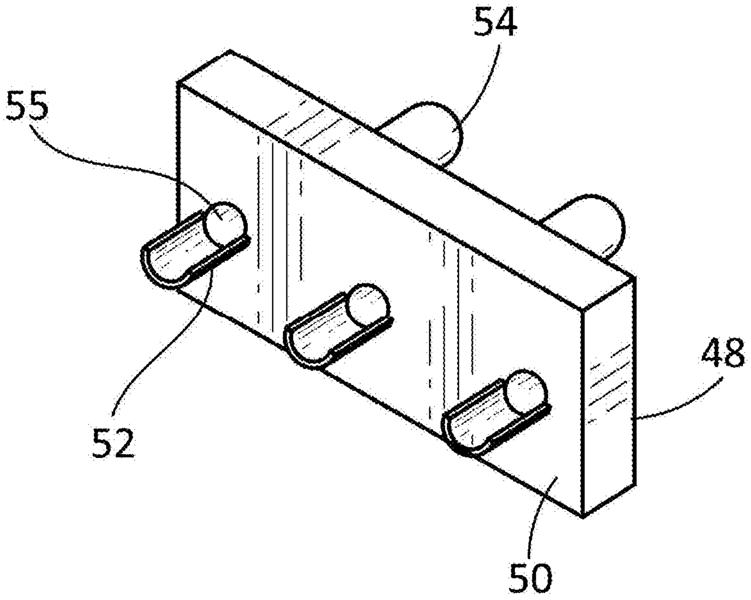
FIG. 5 is a perspective view of the adjustment plate of the stop hinge of FIG. 1.

The stop cover 58 is made of a resilient, soft plastic or rubber material, such as a thermoplastic polyurethane (TPU) material. As the strap 14 and stop cover 58 rotate from the door closed position, shown in FIG. 3, to a door open position, shown in FIG. 4, the stop wall surface 62 of stop wall 60 contacts or abuts the upper surface 29 (side surface when mounted vertically) of the mounting flange middle portion 20. However, as the stop cover 58 is made of a soft plastic material, the contact between the stop cover 58 and the mounting flange 12 is cushioned and is not abrupt and therefore this contact does not cause damage or excessive wear to these components, a problem associated with prior art hinges.

With the stop hinge 10 shown in the drawings, the stop wall 60 is shown to have a stop wall surface 62 that contacts the upper surface 29 of the mounting flange 12 when the hinge strap 14 is rotated approximately 90 degrees from the door closed position. However, it should be understood that this stop angle may be varied depending upon the configuration or location of the stop wall surface 62 and/or top surface 29. Therefore, the stop hinge 10 of the present invention provides for a door hinge that limits the swinging movement or pivoting of the door while also preventing excessive wear and damage caused by the pivot limiting feature of the hinge.

It is thus seen that a stop hinge for restaurant and food service equipment is now provided that does not cause damage. Although the invention has been shown and described in its preferred form, it should be understood that modifications and variations may be made thereto without departure from its spirit and scope as set forth in the following claims.

The invention claimed is:

1. A stop hinge for use with refrigeration equipment, the stop hinge comprising:

a mounting flange having a bumper contact surface;

a strap pivotally coupled to said mounting flange for pivotal movement between a door closed position and a door open position;

a resilient stop cover coupled to said strap, said resilient stop cover including a stop wall having a stop wall surface configured to abut said bumper contact surface when said strap is pivoted to the door open position; and an adjustment plate, and wherein said adjustment plate is coupled to said strap, and wherein said adjustment plate is also coupled to said resilient stop cover;

wherein said adjustment plate has a base and a plurality of alignment pins extending outwardly from a first surface of said base, wherein said plurality of alignment pins are configured to be received within strap screw mounting holes extending through said strap;

wherein said adjustment plate also has at least one boss extending outwardly from a second surface of said base oppositely disposed from said first surface of said base; and wherein said adjustment plate further includes at least one mounting screw extending through said resilient stop cover and threaded into said at least one boss.

2. The stop hinge of claim 1 wherein said resilient stop cover has a recess, wherein said at least one mounting screw positioned at least partially within said recess and threadably coupled to said adjustment plate.

3. The stop hinge of claim 1 wherein said bumper contact surface is an elongated, linear surface, and wherein said stop wall surface is an elongated, linear surface.

4. A stop hinge for use with refrigeration equipment, the stop hinge comprising:

a mounting flange having a top lug, a bottom lug, and a bridge extending between said top lug and said bottom lug;

a strap having a top end pivotally coupled to said top lug and a bottom end pivotally coupled to said bottom lug for pivotal movement between a door closed position and a door open position;

a resilient stop cover coupled to said strap, said resilient stop cover being configured to abut said bridge to limit the pivotal movement of said strap relative to said mounting flange and toward said door closed position; and an adjustment plate, and wherein said adjustment plate is coupled to said strap, and wherein said adjustment plate is also coupled to said resilient stop cover;

wherein said adjustment plate has a base and a plurality of alignment pins extending outwardly from a first surface of said base, wherein said plurality of alignment pins are configured to be received within strap screw mounting holes extending through said strap;

wherein said adjustment plate also has at least one boss extending outwardly from a second surface of said base oppositely disposed from said first surface of said base; and wherein said adjustment plate further includes at least one mounting screw extending through said resilient stop cover and threaded into said at least one boss.

5. The stop hinge of claim 4 wherein said resilient stop cover has a recess, wherein said at least one mounting screw positioned at least partially within said recess and threadably coupled to said adjustment plate.

6. The stop hinge of claim 4 wherein said bridge has an elongated, linear contact surface, and wherein said resilient stop cover has a stop wall surface configured to contact said contact surface of said bridge.

* * * * *